US008762971B2

(12) United States Patent
Bates et al.

(10) Patent No.: US 8,762,971 B2
(45) Date of Patent: Jun. 24, 2014

(54) SERVICING A PRODUCTION PROGRAM IN AN INTEGRATED DEVELOPMENT ENVIRONMENT

(75) Inventors: Cary L. Bates, Rochester, MN (US); Paul R. Day, Rochester, MN (US); Scott W. Elliott, Woodbury, MN (US)

(73) Assignee: International Business Machines Corporation, Armonk, NY (US)

(*) Notice: Subject to any disclaimer, the term of this patent is extended or adjusted under 35 U.S.C. 154(b) by 977 days.

(21) Appl. No.: 12/416,963

(22) Filed: Apr. 2, 2009

(65) Prior Publication Data

US 2010/0257515 A1 Oct. 7, 2010

(51) Int. Cl.
*G06F 9/45* (2006.01)

(52) U.S. Cl.
USPC ............ 717/145; 717/124; 717/126; 717/130

(58) Field of Classification Search
None
See application file for complete search history.

(56) References Cited

U.S. PATENT DOCUMENTS

| | | | | | |
|---|---|---|---|---|---|
| 5,675,803 | A | * | 10/1997 | Preisler et al. ................. | 717/131 |
| 6,085,029 | A | * | 7/2000 | Kolawa et al. ............. | 714/38.13 |
| 6,637,024 | B1 | | 10/2003 | Johnson et al. | |
| 7,062,750 | B2 | * | 6/2006 | Whidby et al. ............... | 717/103 |
| 7,073,096 | B2 | * | 7/2006 | Pouyollon .................. | 714/38.14 |
| 7,150,006 | B2 | * | 12/2006 | Bliss et al. ..................... | 717/124 |
| 7,162,710 | B1 | * | 1/2007 | Edwards et al. .............. | 717/111 |
| 7,568,183 | B1 | * | 7/2009 | Hardy et al. .................. | 717/121 |
| 7,802,228 | B2 | * | 9/2010 | Madkour et al. .............. | 717/103 |
| 7,827,548 | B1 | * | 11/2010 | Anderson et al. ............. | 717/174 |
| 8,423,961 | B2 | * | 4/2013 | Byers et al. ................... | 717/124 |
| 2004/0123271 | A1 | * | 6/2004 | Bindewald et al. ........... | 717/124 |
| 2005/0132346 | A1 | * | 6/2005 | Tsantilis ....................... | 717/168 |
| 2005/0144599 | A1 | * | 6/2005 | Styles et al. .................. | 717/140 |
| 2006/0236310 | A1 | * | 10/2006 | Domeika et al. .............. | 717/140 |

OTHER PUBLICATIONS

"Run and Analyze Software Tests with Rational Clearquest Test Management", published Oct. 17, 2006, by Brian Bryson.*
"IBM Rational Clearcase", published 2007.*
"IBM Rational Build Forge", published 2007.*
"CASEVision/Clearcase Users Guide", published May 15, 2001, by Posner.*

* cited by examiner

*Primary Examiner* — Lewis A Bullock, Jr.
*Assistant Examiner* — Christine Dang
(74) *Attorney, Agent, or Firm* — Wood, Herron & Evans, LLP

(57) ABSTRACT

A method, apparatus and program product are provided for servicing a production program. A mirror program is dynamically created using source code associated with the production program. The mirror program includes enhanced serviceability functionally relative to the production program that generates service information relevant to the production program. The mirror program executes while the production program remains in an active state such that the production program may be serviced using service information generated by the mirror program. The source code used to compile the production program is compared to a base line copy of the source code. Portions of the source code that differ from the base line copy of the source code are stored. The stored portions of the source code are associated with a unique identifier which is saved with the compiled production program.

21 Claims, 4 Drawing Sheets

SERVICING A PRODUCTION PROGRAM IN AN INTEGRATED DEVELOPMENT ENVIRONMENT

FIELD OF THE INVENTION

The present invention relates to computers and data processing, and more particularly to servicing program code.

BACKGROUND OF THE INVENTION

One of a number of challenges facing the software industry is serviceability of production code. System code shipped to a customer is generally optimized for maximum performance, but not for serviceability. This configuration may present challenges when customers report code problems. It is generally a long process to get serviceable code onto their system so that software support personnel can proceed in diagnosing the problem. The contemporary process typically begins by first having the customer recreate the problem. Then, the software supplier is contacted and support personnel then notifies development personnel. The development personnel then provides serviceable code for the given release and service pack level for the customer's system. Development personnel also try to anticipate which system programs will need to be serviceable (debuggable) when installed onto the customer's system. Next, the customer needs to be willing to stop production or otherwise free up their system while the serviceable code is loaded onto the system. This can sometimes take days for a window of opportunity to open, and often results in waiting for a weekend.

Once serviceable code is loaded, the code to be replaced is often linked to pre-started jobs, so just replacing the system code with the serviceable code itself will not start the serviceable code unless or until the pre-started jobs are restarted. In some situations, the restarts may not be simple and may require identifying subsystems and the savvy to know which jobs to restart. Then, when the serviceable code is finally applied and being called by the jobs of interest, the software development personnel may have anticipated incorrectly and may need to determine which additional serviceable code needs to be generated and applied on the system in order to continue the debug, potentially having the whole cycle repeated.

Additional challenges when trying to service code on a customer system may also occur when the code does not have appropriate levels of debug data, or when developers may need to debug code in areas, which were initially unforeseen. In these situations, the user may be actively using the program and have the program in a preferred state. These users would be reluctant to end the debug session, recompile or re-apply the program with debug data and start over. Rather, these users would prefer that service personnel simply start debugging the program of interest at the current location without stopping their application.

Therefore there is a need in the art to reduce the time and disruption when servicing production code on customers' systems.

SUMMARY OF THE INVENTION

Embodiments of the invention address the challenges in the art by providing a method, apparatus, and program product for servicing a production program subsequent to a performance issue being encountered during execution of the production program. In one aspect of the embodiments of the invention, a mirror program of the production program may be created using a set of source code associated with the original compile of the production program. The mirror program may additionally include enhanced serviceability functionally relative to the production program that generates service information relevant to the production program. The mirror program may then be executed while the production program remains in an active state such that the production program may be serviced using service information generated by the mirror program.

In some embodiments, the service information may include debugging information. In other embodiments, the service information may include dumps of production program variables in response to exceptions. For still other embodiments, the production program may be replaced with the mirror program and the mirror program may be executed in place of the production program, when the production program is inactive, to generate service information.

In a second aspect of embodiments of the invention, a set of source code for generating a production program in an integrated development environment may be preserved for later use. In some embodiments, the source code used to compile the production program may be compared to a base line copy of the source code. Portions of the source code that differ from the base line copy of the source code may then be stored. The stored portions of the source code are associated with a unique identifier, and the unique identifier may then be saved with the compiled production program.

In some embodiments, the compiler options and the compiler version are stored with the portions of the source code. The stored portions of the source code may then be retrieved using the unique identifier saved with the production program. The base line copy of the source code is retrieved and a temporary copy of the source code is created by updating the base line copy with additional retrieved portions of the source code. The temporary copy of the source code may then be compiled with additional compiler options. In some embodiments, the additional compiler options stored with the portions of the source code are retrieved with the compiler version. This compiler version is then used to recompile the temporary copy of the source code.

In some embodiments, the portions of the source code may be stored in a database. In these embodiments, the portions of the source code may be keyed off of the unique identifier. In other embodiments, the base line copy of the source code is stored in the integrated development environment. The unique identifier, for some embodiments, may be a version number of the production program or a timestamp in other embodiments.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

Figure 1:
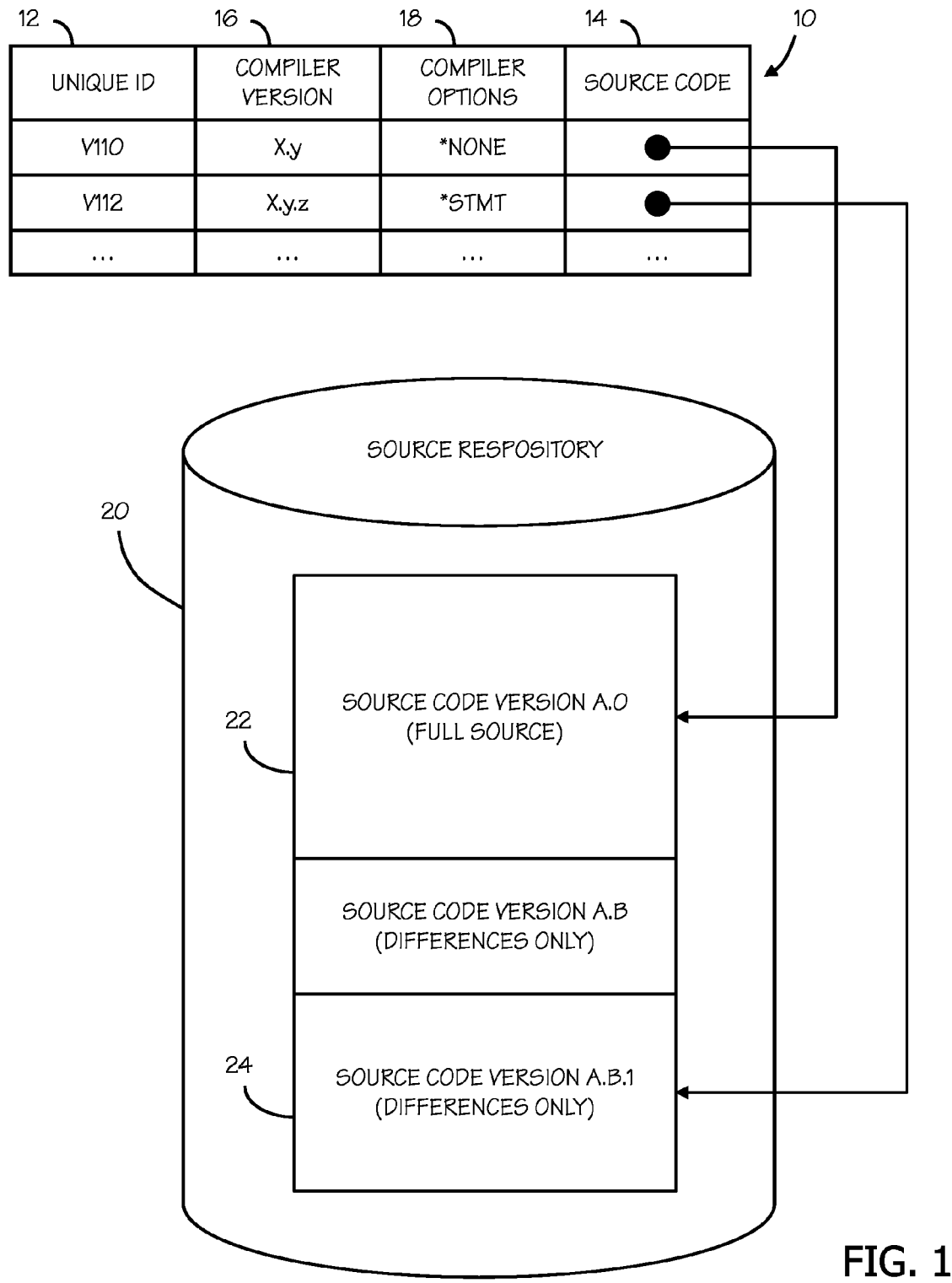
FIG. 1 is a table and diagram of a source repository that may be used with embodiments of the invention to generate a mirror program.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

In assisting customers with problems with production program code, software support and development personnel generally use debugging tools. When the program crashes or encounters a problem, the debugger shows the position in the original code if it is a source-level debugger or symbolic debugger, commonly seen in integrated development environments. If it is a low-level debugger or a machine-language debugger, however, it shows the line in the disassembly. Typically, source-level or symbolic debuggers also offer more sophisticated functions such as running a program step by step (single-stepping), stopping (breaking) (pausing the program to examine the current state) at some kind of event by means of breakpoint, and tracking the values of some variables making their use much more attractive than using a low-level debugger. Some of the source-level and symbolic debuggers also have the ability to modify the state of the program while it is running, rather than merely to observe it.

Integrated Development Environments ("IDE") are software applications that generally provide comprehensive facilities to computer programmers for software development. An IDE typically consists of a source code editor, a compiler and/or interpreter, build automation tools, and usually a debugger. Sometimes a version control system and various other tools are integrated in the IDE to simplify the construction of a Graphical User Interface ("GUI"). Many modem IDEs also have a class browser, an object inspector, and a class hierarchy diagram, for use with object oriented software development.

Generally, additional compiler options are used when compiling program code to be used with a debugger or IDE providing additional serviceability of the production program through additional control and/or connections to the source used to generate the program code. A benefit of these additional compiler options is that program code can be monitored and debugged with tools such as an IDE. Drawbacks to these additional compiler options, however, include program code that is not optimized for the system, thus requiring longer run times in a production environment. But, when optimized, only low level debug information is available, which may not provide enough information for software development personnel to diagnose problems. Embodiments of the invention address this situation by providing a mirror program to be used in conjunction with the production program that contains the corresponding debug information needed to service the production program. For example, when debug is started against an executing production program without debug data, an IDE may use an identifier saved with the production program to create a mirror program whose debug data can then be used to debug the executing production program. The IDE may be configured such that the debug data from an identical mirror program created with a higher level of debug data may be used against the associated production program created with a lower level of debug data. Alternatively, if the production program is not running, the IDE may automatically recreate the program with debug data and replace the existing production program.

Contemporary IDEs generally do not save information necessary to go back and create an exact build of any given program ever built by the IDE. Embodiments of the invention, however, enable IDEs to track and save all source parts used to build an executable including compiler options and versions and then associate them with an identifier saved in the production program. In one embodiment, for example as seen in FIG. 1, a table 10 is constructed to track unique identifiers (such as version ids), source code, and compiler information in order to be able to recreate any given executable. Given the unique identifier 12 stored in the production program, the IDE references the table 10 to find and create the exact source code 14 that was used to create the program, including the version of the compiler 16 and any compile options 18. The source code may be stored in a separate source repository 20 within the IDE, or in other embodiments, stored in a separate data structure outside of the IDE. Because source code for some programs may contain millions of lines of code, it typically would not an effective use of storage to save full versions of source code for each version of production code compiled. Therefore, in some embodiments, some versions of source code would be saved in full, while other versions would save only the differences in the code between versions. For example, in the source repository 20 in FIG. 1, a full set of source code 22 for software version A.0 may be stored. When updates to the main version of software are compiled and released, only the changes to the source code are stored. For example, only the source code that has changed would be stored in the source code 24 for version A.B.1. When the IDE needs to recreate the source for this version, the IDE will start first with the last known full set of source code, then replace any of the source routines that have changes from the differences stored with the required version. In other words, source code 22 would be updated with source code 24 prior to any compiling steps in the IDE. Once the source code is selected, the IDE can then utilize the proper compiler version stored in table 10 and compile the source code with the same or different compiler options.

Figure 2:
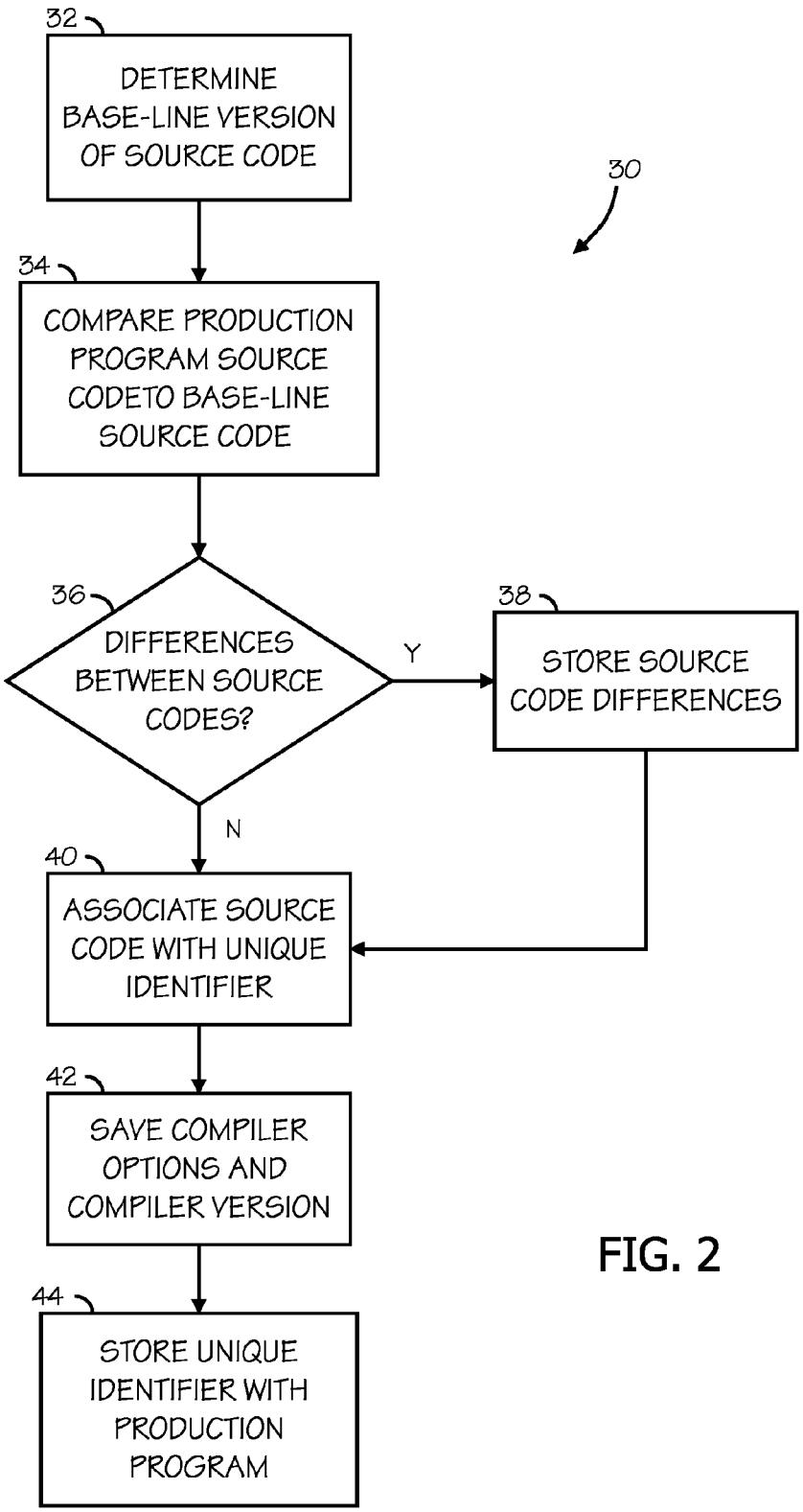
FIG. 2 is a flowchart illustrating an exemplary method that may be employed by an IDE for creating and storing information related to a version of a production program.

Flowchart 30 in FIG. 2 illustrates an exemplary method that may be employed by an IDE for creating and storing information related to a version of a production program. A base-line version of the source code is determined (block 32). The production program source is compared to the base-line source code (block 34). If there are differences between the production program source code and the base-line source code ("Yes" branch of decision block 36), then the differences are stored (block 38) in a source repository or other data structure as set forth above. After storage of the source code differences, or if there were no differences in the source code ("No" branch of decision block 36), the source code is associated with a unique identifier for later retrieval (block 40). Compiler options and the compiler version are also saved and associated with the unique identifier (block 42). Finally the unique identified is stored within the compiled production program (block 44) for later identification and if necessary, recreation. The production program can now be delivered and installed at a customer location.

During production use of the program, if an error or problem occurs, support personnel may be contacted with a description of the problem. The support personnel may then identify the production program that is potentially the cause of the problem and retrieve the unique identifier that was stored with the program at creation. The program and ID may then be passed along to development personnel for diagnosis and debugging. The development personnel may then use the unique identifier to recreate the program with the same source code and the same compiler version, but with different compiler options to generate a mirror program containing additional service information, such as debug data or dumps of production program variables in some embodiments. The mirror program may then be sent to the client and associated with the production program, or otherwise used in an IDE across a network communicating with the production program at the customer location. One of ordinary skill in the art will realize that the version of the program may be important in some cases as an incorrect version may contain an incompatibility that could potentially cause damage to customer data.

Figure 3:
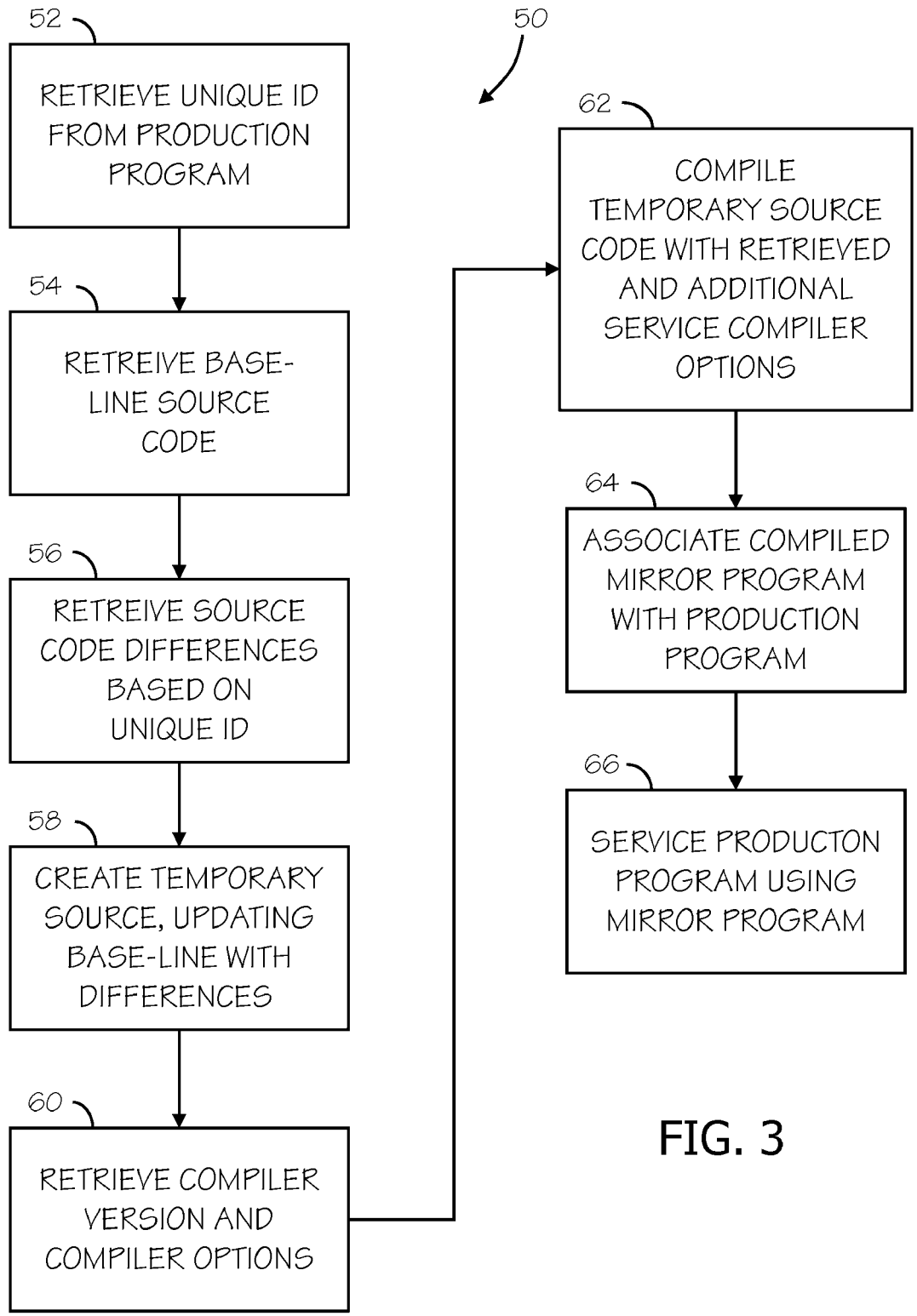
FIG. 3 is a flowchart illustrating an exemplary method that may be employed by an IDE for creating a mirror program of a production program from the information stored in FIG. 2.

Flowchart 50 in FIG. 3 illustrates an exemplary method that may be employed by an IDE for creating a mirror program of a production program with enhanced serviceability. A unique ID stored in the production program at compile time is retrieved (block 52). Based on this unique ID, a baseline of the source code used to create the production program 22 is retrieved (block 54) from the source repository 20 in an IDE or other associated data structure. If the production program was not created from the baseline version of the source code, the source code differences, such as the version differences 24 in FIG. 1, from the specific version are retrieved (block 56) from the source repository 20 in the IDE or other associated data structure. A temporary version of the source code is then created by updating the baseline version with the retrieved differences (block 58). One of ordinary skill in the art will realize that if the production program was created from the baseline version of the source code, then the steps in blocks 56 and 58 of flowchart 50 would not be necessary. The original compiler version and options may then be retrieved (block 60), for example from a table such as table 10 in FIG. 1. The compiler version, in some embodiments, may also be part of the unique ID and extracted from the identifier. One of ordinary skill in the art will realize that there are a number of methods for storing and retrieving software version and compiler version information which can be used with embodiments of the invention.

The temporary source code is then compiled with the retrieved compile options as well as with compile options to provide additional serviceability data to create a mirror program for the production program (block 62). The mirror program may then be associated with the production program in the IDE (block 64) and then used to service the production program to diagnose problems (block 66) without having to stop or otherwise disrupt the production program.

Because the same source, compiler version, and compiler options (now including debug data) were used to create the mirror program, the mirror program contains the debug data that would have been available to the production program, had the production program been compiled with the same debug options. Therefore, when the IDE needs debug information for the executing production program, it can retrieve that information from the mirror program.

However, in some compiler implementations on some platforms, adding a debug option may change the way that the machine code is generated by the compiler. For example, on some platforms, adding a debug option to the compile may turn off inlining during optimization in the compiler. In such a case, the debug data generated for the mirror program will be identical to what would have been generated had the currently executing program been originally compiled requesting debug data. But because the compiler may change the way the machine code is generated, the mirror program itself may not be identical to the currently executing program, which may cause problems. In this case what is meant by identical is that the production program and the mirror program are made up of the exact same machine instructions. Logically, the debug data sits off to the side and does not impact the generation of machine code. It is desirable for the IDE to be able to produce a mirror program identical to the production program. In some cases, this will require that the compiler is provided with special debug options that will prevent it from interacting with the optimizer, ensuring that an identical program with debug data can be created. In these configurations, the IDE may utilize a compatibility table in order to determine, based on how the program was originally compiled, which options to use to produce an identical program with debug data. Only then can the debug data associated with the mirror program be used to service a currently executing production program that does not have debug data.

However, in the event the production program is not executing, there is a lesser concern about the programs having identical machine code. If the program is compiled with the exact same source, it should run in the same way and does not need to be made up of identical machine instructions. In fact, in this case, it may be desirable to produce a program that is as completely debuggable as possible.

Figure 4:
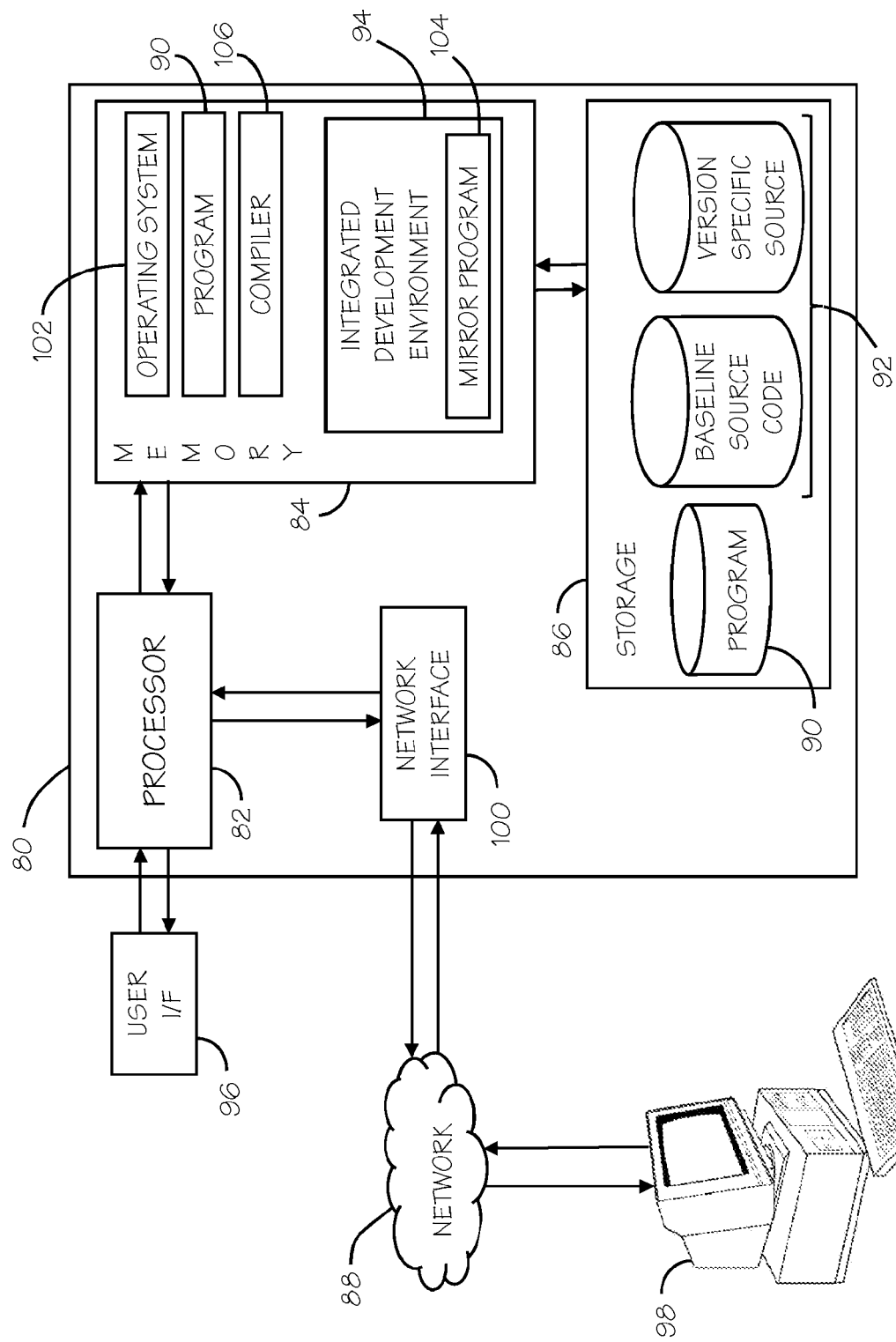
FIG. 4 is a block diagram of an exemplary hardware and software environment for a computer suitable for implementing enhanced serviceability of a production program consistent with embodiments of the invention.

FIG. 4 illustrates an exemplary hardware and software environment for an apparatus 80 suitable for debugging production programs in a manner consistent with embodiments of the invention. For the purposes of the invention, apparatus 80 may represent practically any computer, computer system, or programmable device, e.g., multi-user or single-user computers, desktop computers, portable computers and devices, handheld devices, network devices, mobile phones, etc. Apparatus 80 will hereinafter be referred to as a "computer" although it should be appreciated that the term "apparatus" may also include other suitable programmable electronic devices.

Computer 80 typically includes at least one processor 82 coupled to a memory 84. Processor 82 may represent one or more processors (e.g. microprocessors), and memory 84 may represent the random access memory (RAM) devices comprising the main storage of computer 80, as well as any supplemental levels of memory, e.g., cache memories, non-volatile or backup memories (e.g. programmable or flash memories), read-only memories, etc. In addition, memory 84 may be considered to include memory storage physically located elsewhere in computer 80, e.g., any cache memory in a processor 82, as well as any storage capacity used as a virtual memory, e.g., as stored on a mass storage device 86 or another computer coupled to computer 80 via a network 88. The mass storage device 86 may contain a copy of the production program 90 and a copy of the source code 92 used to generate the production program 90 and for use in an IDE 94.

Computer 80 also typically receives a number of inputs and outputs for communicating information externally. For interface with a user or operator, computer 80 typically includes one or more user interface devices 96, such as input devices (e.g., a keyboard, a mouse, a trackball, a joystick, a touchpad, a keypad, a stylus, and/or a microphone, among others). Interface devices 96 may also include a display or other output device (e.g., a CRT monitor, an LCD display panel, and/or a speaker, among others). The interface to computer 80 may also be through an external terminal connected directly or remotely to computer 80, or through another single (or multi) user computer 98 communicating with computer 80 via a network 88, modem, or other type of communications device.

Computer 80 communicates on the network 88 through a network interface 100. The single user computer 98 may be used as a graphical debugger interfacing with the IDE 94 when debugging the production program 90.

Computer 80 operates under the control of an operating system 102, and executes or otherwise relies upon various computer software applications, components, programs, objects, modules, data structures, etc. (e.g. production program 90 executing in memory, IDE 94 accessing a mirror program 104, or compiler 106). For example, as set forth above, the IDE 94 may generate the mirror program 104 from the source code 92 and compile it with compiler 106. The mirror program 104 may then be used by the IDE 94 to service the production program 90 executing in memory 84.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described herein may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 4 is not intended to limit the present invention. Indeed, those skilled in the art will recognize that other alternative hardware and/or software environments may be used without departing from the scope of the invention. For example, multiple computer systems may be used. The production program 90 may be running on hardware at a customer location that is separate from the development and software production hardware used by software developers. These machines may interact with each other and the IDE 94 over network 88. Any number of hardware configurations and implementations may be used with the embodiments of the invention set forth above.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of generating a mirror program for use in servicing a production program in an integrated development environment, the method comprising:
   generating the production program, wherein generating the production program comprises:
      compiling source code to generate the production program;
      comparing the source code used to compile the production program to a base line copy of the source code;
      storing portions of the source code that differ from the base line copy of the source code;
      storing compiler options with the portions of the source code;
      associating the stored portions of the source code with a unique identifier; and
      saving the unique identifier with the compiled production program;
   subsequent to a problem encountered during production use of the production program, generating the mirror program, wherein generating the mirror program comprises:
      retrieving the stored portions of the source code using the unique identifier saved with the production program;
      retrieving the base line copy of the source code;
      retrieving the compiler options stored with the portions of the source code;
      creating a temporary copy of the source code by updating the base line copy with the retrieved portions of the source code;
      recompiling the temporary copy of the source code with the retrieved compiler options and additional compiler options to provide a higher level of debug data than the production program and enhanced serviceability functionally in the mirror program relative to the production program; and
      executing the mirror program while the production program remains in an active state such that the production program may be serviced using service information generated by the mirror program and the higher level of debug data may be used against the production program.

2. The method of claim 1 wherein the service information comprises debugging information.

3. The method of claim 1 wherein the service information comprises a dump of production program variables in response to an exception.

4. The method of claim 1 wherein the production program and the mirror program have identical machine instructions.

5. The method of claim 1 further comprising:
   storing a compiler version with the portions of the source code.

6. The method of claim 1 further comprising:
retrieving a compiler version with the portions of the source code,
wherein a compiler of the version retrieved is used to recompile the temporary copy of the source code.

7. The method of claim 1 wherein the portions of the source code are stored in a database.

8. The method of claim 7 wherein the portions of the source code are keyed off of the unique identifier.

9. The method of claim 1 wherein the base line copy of the source code is stored in the integrated development environment.

10. The method of claim 1 wherein the unique identifier is a version number of the production program.

11. The method of claim 1 wherein the unique identifier is a timestamp.

12. An apparatus comprising:
at least one processor; and
program code configured to be executed by the at least one processor to generate a mirror program for use in servicing a production program in an integrated development environment, the program code configured to generate the production program and, subsequent to a problem encountered during production use of the production program, generate the mirror program, wherein the program code is configured to generate the production program by compiling source code to generate the production program, comparing the source code used to compile the production program to a base line copy of the source code, storing portions of the source code that differ from the base line copy of the source code, storing compiler options with the portions of the source code, associating the stored portions of the source code with a unique identifier, and saving the unique identifier with the compiled production program, and wherein the program code is configured to generate the mirror program by retrieving the stored portions of the source code using the unique identifier saved with the production program, retrieving the base line copy of the source code, retrieving the compiler options stored with the portions of the source code, creating a temporary copy of the source code by updating the base line copy with the retrieved portions of the source code, recompiling the temporary copy of the source code with the retrieved compiler options and additional compiler options to provide a higher level of debug data than the production program and enhanced serviceability functionally in the mirror program relative to the production program, and executing the mirror program while the production program remains in an active state such that the production program may be serviced using service information generated by the mirror program and the higher level of debug data may be used against the production program.

13. The apparatus of claim 12 wherein the program code is further configured to store a compiler version with the portions of the source code.

14. The apparatus of claim 12 wherein the program code is further configured to retrieve a compiler version with the portions of the source code, and wherein a compiler of the version retrieved is used to recompile the temporary copy of the source code.

15. The apparatus of claim 12 wherein the portions of the source code are stored in a database.

16. The apparatus of claim 15 wherein the portions of the source code are keyed off of the unique identifier.

17. The apparatus of claim 12 wherein the base line copy of the source code is stored in the integrated development environment.

18. The method of claim 12 wherein the unique identifier is selected from a group consisting of a version number of the production program, a timestamp, and combinations thereof.

19. A program product, comprising:
a non-transitory computer readable medium; and
program code resident on the non-transitory computer readable medium and configured to be executed by at least one processor to generate a mirror program for use in servicing a production program in an integrated development environment, the program code configured to generate the production program and, subsequent to a problem encountered during production use of the production program, generate the mirror program, wherein the program code is configured to generate the production program by compiling source code to generate the production program, comparing the source code used to compile the production program to a base line copy of the source code, storing portions of the source code that differ from the base line copy of the source code, storing compiler options with the portions of the source code, associating the stored portions of the source code with a unique identifier, and saving the unique identifier with the compiled production program, and wherein the program code is configured to generate the mirror program by retrieving the stored portions of the source code using the unique identifier saved with the production program, retrieving the base line copy of the source code, retrieving the compiler options stored with the portions of the source code, creating a temporary copy of the source code by updating the base line copy with the retrieved portions of the source code, recompiling the temporary copy of the source code with the retrieved compiler options and additional compiler options to provide a higher level of debug data than the production program and enhanced serviceability functionally in the mirror program relative to the production program, and executing the mirror program while the production program remains in an active state such that the production program may be serviced using service information generated by the mirror program and the higher level of debug data may be used against the production program.

20. The program product of claim 19 wherein the service information comprises debugging information.

21. The program product of claim 19 wherein the production program and the mirror program have identical machine instructions.

* * * * *